(12) United States Patent
Sugimoto (10) Patent No.: US 9,238,402 B2
(45) Date of Patent: Jan. 19, 2016

(54) VEHICLE CONTROL APPARATUS

(75) Inventor: Hitoki Sugimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 418 days.

(21) Appl. No.: 13/211,885

(22) Filed: Aug. 17, 2011

(65) Prior Publication Data

US 2012/0046814 A1    Feb. 23, 2012

(30) Foreign Application Priority Data

Aug. 20, 2010    (JP) .................................. 2010-185061

(51) Int. Cl.
*B60W 10/06*    (2006.01)
*B60W 20/00*    (2006.01)
*B60K 6/445*    (2007.10)

(52) U.S. Cl.
CPC ............. *B60K 6/445* (2013.01); *Y02T 10/6239* (2013.01); *Y02T 10/7038* (2013.01); *Y02T 10/7258* (2013.01); *Y02T 10/7283* (2013.01)

(58) Field of Classification Search
CPC .................... Y02T 10/7283; Y02T 10/7038
USPC .................... 180/65.28; 123/179.3
See application file for complete search history.

(56) References Cited

U.S. PATENT DOCUMENTS

| 5,804,711 A * | 9/1998 | Remboski et al. ......... 73/114.05 |
| 6,460,500 B1 * | 10/2002 | Ooyama et al. ............ 123/179.3 |
| 6,522,024 B1 * | 2/2003 | Takaoka et al. ............ 290/40 C |
| 6,594,987 B2 * | 7/2003 | Uranishi ...................... 60/277 |
| 6,892,541 B2 * | 5/2005 | Suzuki ......................... 60/706 |
| 6,962,224 B2 * | 11/2005 | Nakanowatari .......... 180/65.225 |
| 7,059,997 B2 * | 6/2006 | Nishizawa et al. ............ 477/3 |
| 7,293,453 B2 * | 11/2007 | Aono et al. ................ 73/114.38 |
| 7,425,891 B2 * | 9/2008 | Colburn et al. .............. 340/438 |
| 7,467,033 B2 * | 12/2008 | Miller et al. .................. 701/22 |
| 7,665,558 B2 * | 2/2010 | Akimoto et al. .......... 180/65.28 |
| 7,848,875 B2 * | 12/2010 | Nakai ......................... 701/113 |
| 8,041,502 B2 * | 10/2011 | Akimoto ..................... 701/111 |
| 8,229,616 B2 * | 7/2012 | Aridome et al. .............. 701/22 |
| 8,271,156 B2 * | 9/2012 | Jinno et al. ................... 701/22 |
| 8,437,896 B2 * | 5/2013 | Kaita et al. ................... 701/22 |

(Continued)

FOREIGN PATENT DOCUMENTS

| JP | 05-202799 A | 8/1993 |
| JP | 2004-100520 A | 4/2004 |

(Continued)

OTHER PUBLICATIONS

Office action from JP 2010-185061, dated Apr. 24, 2012, and partial English translation thereof.

*Primary Examiner* — Joseph Rocca
*Assistant Examiner* — Travis Coolman
(74) *Attorney, Agent, or Firm* — Dinsmore & Shohl LLP (57) ABSTRACT

A vehicle control apparatus for a vehicle that includes an internal combustion engine and an electric motor, and that is capable of traveling by motive power from at least one of the internal combustion engine and the electric motor includes: a control portion that causes the vehicle to travel in a travel mode of a plurality of travel modes that differ in an engine start condition for the internal combustion engine; and a determination portion that determines whether exhaust from the internal combustion engine has deteriorated, wherein the determination portion changes the deterioration determination condition for determining that the exhaust has deteriorated, according to the travel mode.

13 Claims, 6 Drawing Sheets

(56) References Cited

U.S. PATENT DOCUMENTS

| | | | |
|---|---|---|---|
| 8,493,226 B2* | 7/2013 | Tedesco | 340/687 |
| 2009/0101421 A1* | 4/2009 | Oyobe et al. | 180/65.29 |
| 2009/0322503 A1* | 12/2009 | Suzuki et al. | 340/438 |
| 2010/0036591 A1* | 2/2010 | Nakai | 701/112 |
| 2010/0044131 A1* | 2/2010 | Teraya | 180/65.265 |
| 2010/0138089 A1* | 6/2010 | James | 701/22 |

FOREIGN PATENT DOCUMENTS

| | | |
|---|---|---|
| JP | 2006-009746 A | 1/2006 |
| JP | 2006-194124 A | 7/2006 |
| JP | 2007-216796 A | 8/2007 |
| JP | 2008-168806 A | 7/2008 |
| JP | 2010-047218 A | 3/2010 |
| JP | 2010-052610 A | 3/2010 |

* cited by examiner

VEHICLE CONTROL APPARATUS

CROSS REFERENCE TO RELATED APPLICATIONS

This application claims priority to Japanese Patent Application No. 2010-185061 filed on Aug. 20, 2010, which is incorporated herein by reference in its entirety including the specification, drawings and abstract.

BACKGROUND OF THE INVENTION

1. Field of the Invention

The invention relates to a control of a vehicle, more particularly, to a control of a hybrid vehicle.

2. Description of Related Art

In recent years, taking environmental issues into account, hybrid vehicles that efficiently combine an engine and an electric motor have been put into practical use. Such hybrid vehicles are equipped with a rechargeable battery, and propel itself using an electric motor by supplying the electric motor with electric power from the battery at the time of launch or acceleration. In contrast, at the time of braking or the like, kinetic energy of the vehicle is converted by the electric motor into electric power, which is recovered into the battery.

Japanese Patent Application Publication No. 2010-47218 (JP-A-2010-47218) describes a plug-in hybrid vehicle, the traveling of the vehicle is performed by selecting one of a mode in which an EV travel in which the engine is stopped and the vehicle travels by motive power from the electric motor is given priority, and a mode in which an HV travel in which the vehicle travels by motive power from both the engine and the electric motor is permitted.

In addition, Japanese Patent Application Publication No. 2008-168806 (JP-A-2008-168806) describes a hybrid vehicle equipped with different engine start conditions.

Exhaust gas from an engine contains pollutants such as hydrocarbon, carbon monoxide, nitrogen oxides, etc. These pollutants are substantially removed by a catalyst that is provided in the exhaust pipe of the engine. However, depending on the state of the engine, the amount of the pollutants in the exhaust sometimes exceeds the purification capacity of the catalyst. Therefore, it is desirable to accurately detect deterioration of the quantity of engine exhaust.

SUMMARY OF THE INVENTION

The invention accurately detects deterioration of the quality of engine exhaust in a vehicle that is equipped with a plurality of travel modes that differ in the engine start condition for an internal combustion engine.

A first aspect of the invention relates to a vehicle control apparatus for a vehicle that includes an internal combustion engine and an electric motor, and that is propelled by motive power from at least one of the internal combustion engine and the electric motor; a control portion that controls the vehicle to travel in a travel mode of a plurality of travel modes that differ in an engine start condition for the internal combustion engine; and a determination portion that determines whether exhaust from the internal combustion engine has deteriorated, and the determination portion changes a deterioration determination condition for determining whether the exhaust has deteriorated, in accordance with the travel mode.

In the foregoing aspect, the plurality of travel modes may include a first travel mode in which driving of the internal combustion engine is not permitted in principle and a second travel mode in which the driving of the internal combustion engine is permitted in principle, and the determination portion sets the deterioration determination condition to a first condition in the first travel mode, and sets the deterioration determination condition to a second condition, which is less easily satisfied than the first condition, in the second travel mode.

In the foregoing aspect, the first condition may be satisfied when a physical quantity that indicates a misfire has occurred in the internal combustion engine exceeds a first threshold value, and the second condition is satisfied when the physical quantity exceeds a second threshold value that is greater than the first threshold value.

In the foregoing aspect, the physical quantity may be a state quantity of the internal combustion engine which increases according to occurrence of misfire of the internal combustion engine.

In the foregoing aspect, the first threshold value may the state quantity that occurs when an amount of pollutants contained in the exhaust equals a predetermined amount in the first travel mode, and the second threshold value is the state quantity that occurs when the amount of pollutants equals the predetermined amount in the second travel mode.

In the foregoing aspect, the state quantity may be a number of misfires that occur in the internal combustion engine over a prescribed number of revolutions of the internal combustion engine. Besides, in the foregoing aspect, the state quantity may be at least one of magnitude of vibration of the internal combustion engine, a number of occurrences of the vibration, and air/fuel ratio of the internal combustion engine.

In the foregoing aspect, if the first condition is satisfied in the first travel mode, the control portion performs a continuous operation of prohibiting stop of the internal combustion engine and continues operating the internal combustion engine, and if the first condition is satisfied in the second travel mode, the determination portion may determine whether the exhaust has deteriorated using a third condition, which differs from the first condition and from the second condition, as the deterioration determination condition when or after a predetermined period of time elapses following start of the continuous operation.

In the foregoing aspect, the vehicle may further include a battery that that supplies electric power to the electric motor, and a switch that a user uses to select the travel mode that the user demands from the plurality of travel modes and input the selected travel mode, and wherein the control portion selects the travel mode based on state of charge of the battery and output of the switch.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
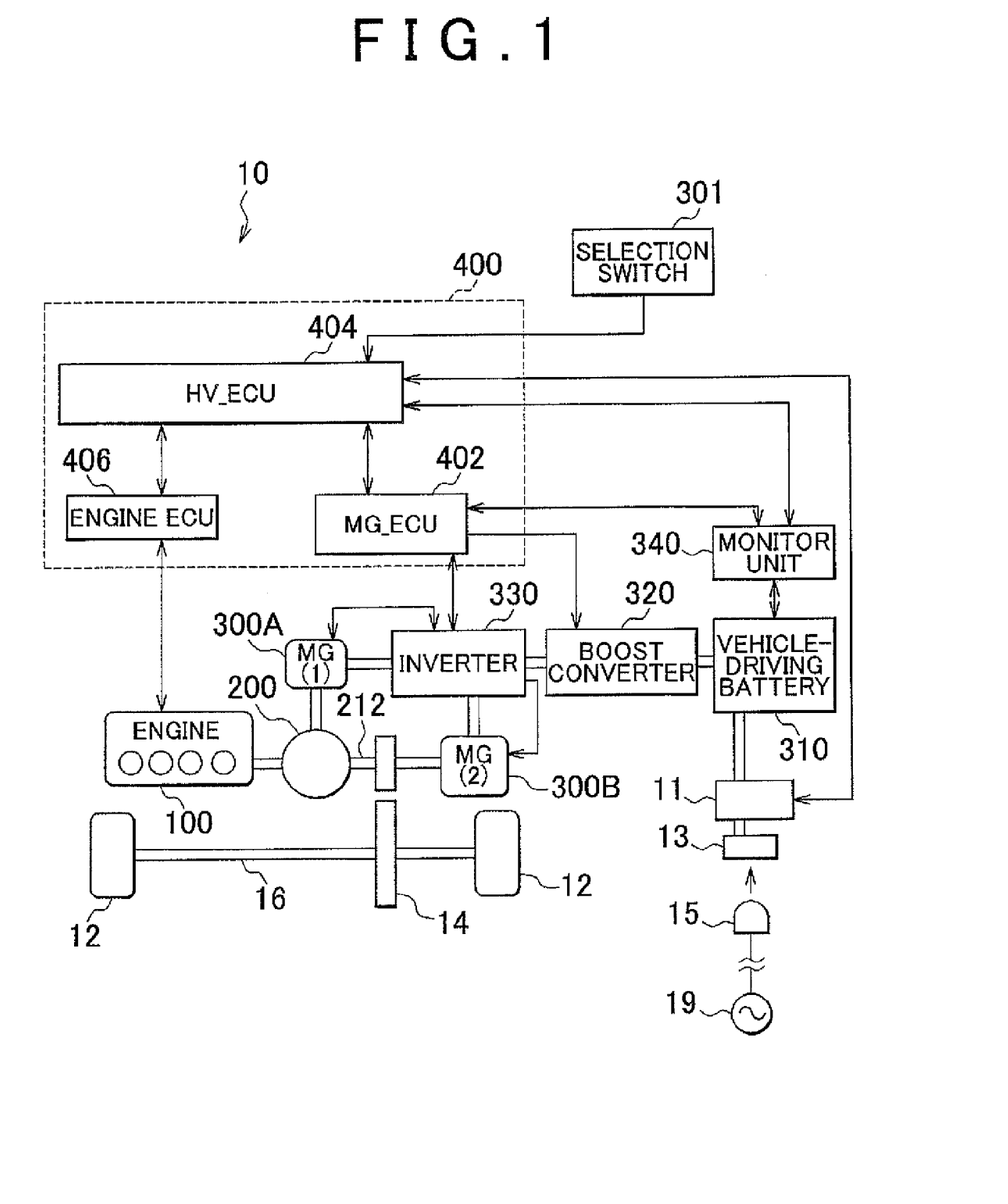
FIG. 1 shows the structure of a vehicle equipped with an ECU according to an embodiment of the invention.

FIG. 1 is a diagram of the structure of a vehicle 10 equipped with an electronic control unit (ECU) (i.e., a control apparatus) in accordance with an embodiment of the invention. The vehicle 10 is a plug-in hybrid vehicle. Specifically, the vehicle 10 is propelled by motive power from at least one of an engine 100 and a second motor-generator (hereinafter, referred to as "MG(2)") 300B, and includes a battery 310 that supplies electric power to the MG(2) 300B and the like and that may be charged using electric power from an alternating-current power supply 19 provided outside the vehicle 10, such as a residential electric supply. However, the vehicle 10 is not restricted to a plug-in hybrid vehicle.

In addition, the vehicle 10 further includes a power-split mechanism 200, a speed reducer 14, an inverter 330, a boost converter 320, an engine ECU 406, an MG_ECU 402, an HV_ECU 404, etc.

The power splitting mechanism 200 is constructed of a planetary gear set that includes a sun gear, pinions, a carrier and a ring gear. The power splitting mechanism 200 distributes motive power generated by the engine 10 to an output shaft 212 and a first motor-generator (MG(1)) 300A. Because the engine 100, the MG(1) 300A and the MG(2) 300B are linked together via the power splitting mechanism 200, if the rotational speeds of any two of the engine 10, the MG(1) 300A and the MG(2) 300B are known, the rotational speed of the third may be determined.

The speed reducer 14 transfers motive power generated by the engine 100, the MG(1) 300A or the MG(2) 300B to driving wheels 12, or transfers the drive force of the driving wheels 12 to the engine 100, the MG(1) 300A or the MG(2) 300B.

The inverter 330 controls electric current while converting between the direct current of the battery 310 and the alternating current of the MG(1) 300A and the MG(2) 300B.

The boost converter 320 converts the voltage between the battery 310 and the inverter 330.

The engine ECU 406 controls the operating state of the engine 100. The MG_ECU 402 controls the MG(1) 300A, the MG(2) 300B, the inverter 330, and the charge/discharge state of the battery 310, and the like, according to the state of the vehicle 10. The HV_ECU 404 controls the entire hybrid system so that the vehicle 10 operates most efficiently, through management and control together with the engine ECU 406, the MG_ECU 402 and the like.

Furthermore, the vehicle 10 includes a connector 13 to which a paddle 15 connected to the alternating-current power supply 19 is connected, and a charger device 11 that converts the electric power from the alternating-current power supply 19 supplied via the connector 13 into direct-current power and that outputs the converted direct-current power to the battery 310. The charger device 11 controls the electric power amount that is supplied to the battery 310 in accordance with a control signal from the HV_ECU 404.

Although in FIG. 1, each ECU is constructed as a separate unit, two or more ECUs may also be constructed as an integrated ECU. For example, as shown by a dotted line in FIG. 1, the MG_ECU 402, the HV_ECU 404 and the engine ECU 406 may be integrated into an ECU 400. In the description below, the MG_ECU 402, the HV_ECU 404 and the engine ECU 406 are not distinguished, but are collectively termed the ECU 400.

The ECU 400 contains a central processing unit (CPU) and a memory (which are not shown), and executes predetermined computation processes based on maps and programs stored in the memory.

The ECU 400 receives input of signals from a vehicle speed sensor, an accelerator operation amount sensor, a throttle opening degree sensor, an MG(1) rotation speed sensor and an MG(2) rotation speed sensor (none of which is shown) as well as a monitor unit 340 that monitors the status of the battery 310, such as the voltage, the current, the temperature, etc.

Furthermore, a selection switch 301 is connected to the ECU 400. The selection switch 301 may be operated by a user to select a mode that the user demands from two travel modes (a CD mode and a CS mode) described below, and to input the selected mode.

When the ECU 400 controls the MG(1) 300A or the MG(2) 300B to function as an electric motor, the ECU 400 boosts the voltage of the direct-current power discharged from the battery 310 via the boost converter 320, and then converts the direct-current voltage into alternating-current power via the inverter 330, and supplies the alternating-current power to the MG(1) 300A and the MG(2) 300B.

In contrast, when the battery 310 is being charged, the ECU 400 causes the MG(1) 300A to generate electricity using motive power from the engine 100 that is transmitted via the power-split mechanism 200, or causes the MG(2) 300B to generate electricity through the use of energy of the traveling of the vehicle that is transmitted via the speed reducer 14. Then, the ECU 400 converts the alternating-current power generated by the MG(1) 300A or the MG(2) 300B into direct-current power via the inverter 330, and reduces the voltage of the electric power via the boost converter 320, and then supplies the electric power to the battery 310.

In addition, the ECU 400 is also able to charge the battery 310 by supplying electric power from the alternating-current power supply 19 after converting it into direct-current power.

Figure 2:
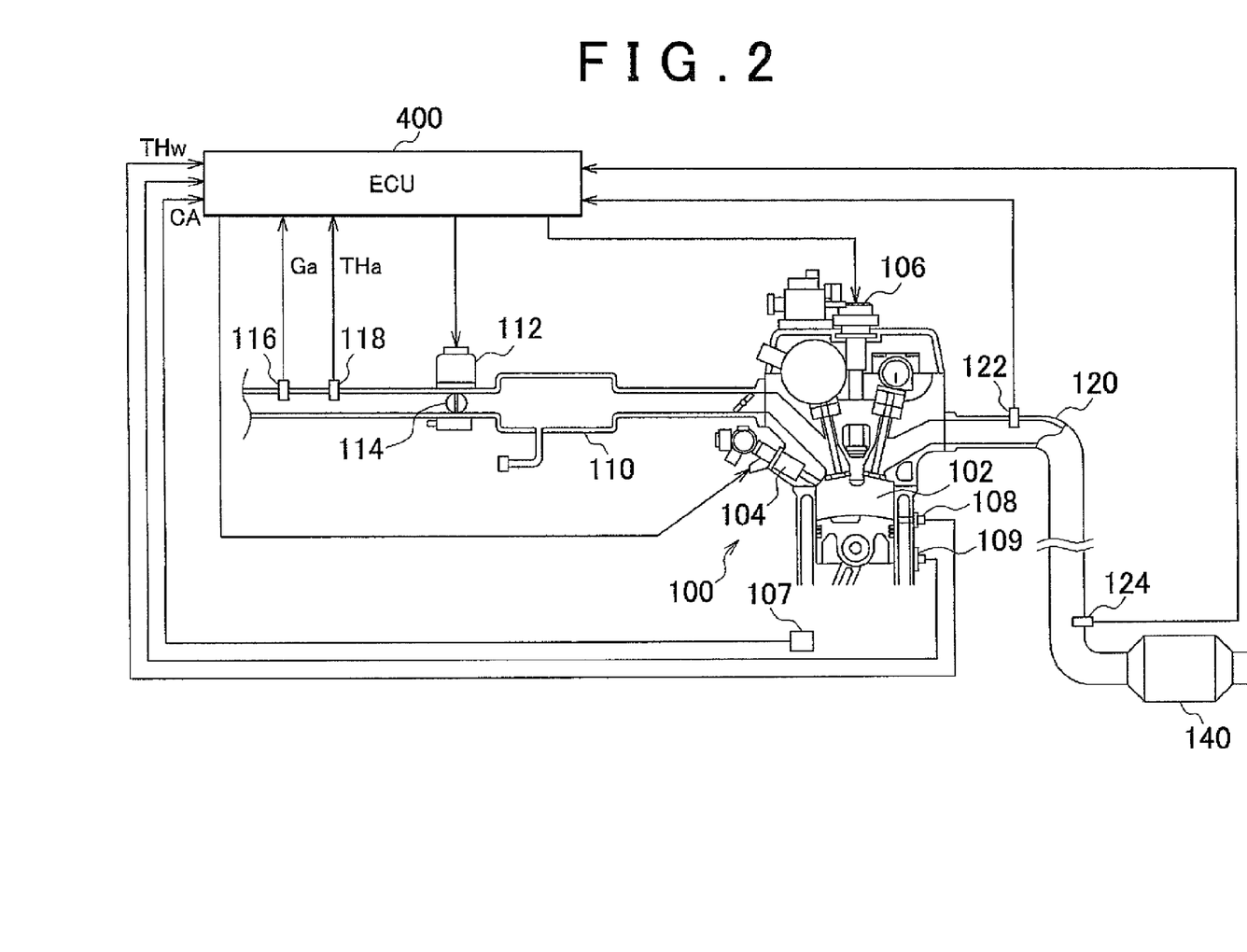
FIG. 2 is a diagram of the engine in accordance with the embodiment and its peripheral appliances.

FIG. 2 shows the engine 100 and its peripheral appliances. Although FIG. 2 only shows one cylinder, the engine 100 actually has a plurality of cylinders.

In the engine 100, air drawn in via an air cleaner (not shown) passes through an intake pipe 110, and is introduced into a combustion chamber 102 of the engine 100. The amount of air introduced into the combustion chamber 102 is adjusted by the degree of throttle opening of a throttle valve 114. The degree of throttle opening is controlled by a throttle electric motor 112 that operates based on a signal from the ECU 400.

An injector 104 injects fuel stored in a fuel tank (not shown) into the combustion chamber 102. The injector 104 opens when electrified to inject fuel toward the combustion chamber 102. Alternatively, the injector 104 may inject fuel into an intake passageway.

A mixture of the air introduced from the intake pipe 110 and the fuel injected from the injector 104 is ignited by an ignition coil 106 that is controlled by a control signal from the ECU 400.

Exhaust produced by the combustion of the mixture passes through a catalyst that is provided in an intermediate portion of an exhaust pipe 120, and is then discharged into the atmosphere. The catalyst 140 may be a three-way catalyst that removes pollutants (hydrocarbon, carbon monoxide, nitrogen oxides, etc.) contained in exhaust. The catalyst 140 is able to simultaneously catalyze the oxidation reaction between hydrocarbon and carbon monoxide and the reduction reaction of nitrogen oxides. The exhaust purification capability of the catalyst 140 decreases with decreases in the catalyst temperature.

The ECU 400 receives signals output from an angle sensor 107, a coolant temperature sensor 108, a vibration sensor 109, an air flow member 116, an air temperature sensor 118, an air/fuel ratio sensor 122, and an oxygen sensor 124.

The angle sensor 107 detects the crank angle CA (the angle of a crankshaft of the engine 100). The coolant temperature sensor 108 detects the temperature THw of an engine coolant. The vibration sensor 109 detects vibration of a cylinder block of the engine 100. The air flow meter 116 detects the amount of air Ga that is taken into the engine 100 per unit time. The air temperature sensor 118 detects the temperature THa of intake air. The air/fuel ratio sensor 122 detects the air/fuel ratio A/F in the exhaust. The oxygen sensor 124 detects the oxygen concentration in exhaust. These sensors send signals that represent results of detection to the ECU 400.

Based on the signals from the sensors and the like, the ECU 400 controls the ignition coil 106 to achieve a proper ignition timing, controls the throttle electric motor 112 to achieve a proper degree of throttle opening, and controls the injector 104 to achieve a proper amount of fuel injection.

Figure 3:
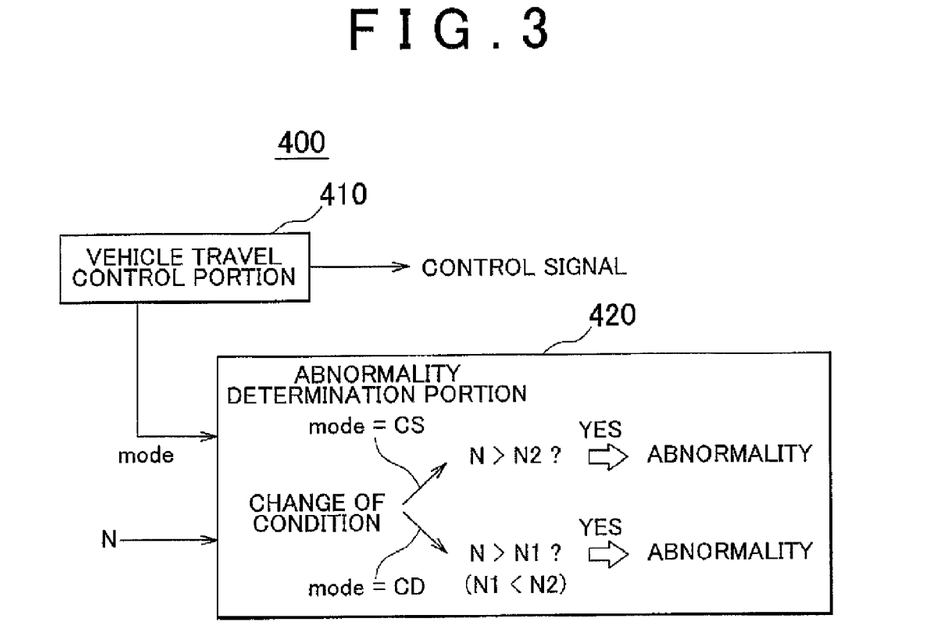
FIG. 3 is a functional block diagram of the ECU that are related to selection of a travel mode and exhaust deterioration determination in accordance with the embodiment.

FIG. 3 is a functional block diagram of the ECU 400 related to travel mode selection and exhaust deterioration determination. Each functional block shown in FIG. 3 may be implemented through either hardware or software.

The ECU 400 includes a travel control portion 410 that selects a travel mode in which the vehicle 10 is caused to travel, and an abnormality determination portion 420 that performs the exhaust deterioration determination. In conjunction with the embodiment, the term "exhaust deteriorates" means that the amount of harmful matter contained in exhaust exceeds a prescribed amount. The abnormality determination portion may function as a determination portion in the invention.

First, the travel control portion 410 will be described in detail. The travel control portion 410 selects the travel mode from between a charge sustain mode (CS mode), in which the driving of the engine 100 is permitted in principle, and a charge depleting mode (CD mode), in which the driving of the engine 100 is not permitted in principle, and controls the vehicle to travel in the selected travel mode. It should be noted that the number of travel modes is not limited to two, but may be three or more.

The manners of travel of the vehicle 10 include a travel that uses motive power from both the MG(2) 300B and the engine 100 (hereinafter, referred to as "HV travel") and a travel that does not use motive power from the engine 100 but uses motive power from the MG(2) 300B (hereinafter, referred to as "EV travel").

The CD mode is a mode in which consumption of electric power of the battery 310 is given priority over the maintenance thereof. Therefore, in the CD mode, the EV travel is given priority in principle. However, when operating under a high load (when a first engine start condition described below is satisfied), starting of the engine 100 is permitted so as to perform the HV travel even when the CD mode has been selected.

In contrast, in the CS mode conservation of the electric power of the battery 310 is prioritized. Therefore, during the CS mode, the HV travel is permitted in principle. Specifically, in the CS mode, the engine 100 is started to perform the HV travel not only when the load is high (when the first engine start condition is satisfied) but also when there is a need for the MG(1) 300A to generate electricity using motive power from the engine 100 in order to maintain the state of charge (hereinafter, referred to as "SOC") of the battery 310 within a predetermined range (e.g., a range of 30% to 60%). Therefore, in the CS mode, the engine 100 is started relatively frequently.

Thus, the travel control portion 410 selects one of the two travel modes that differ in the engine start condition, and causes the vehicle 10 to travel in the selected travel mode. Incidentally, the CD mode may serve as either the first or second mode in the invention.

Figure 4:
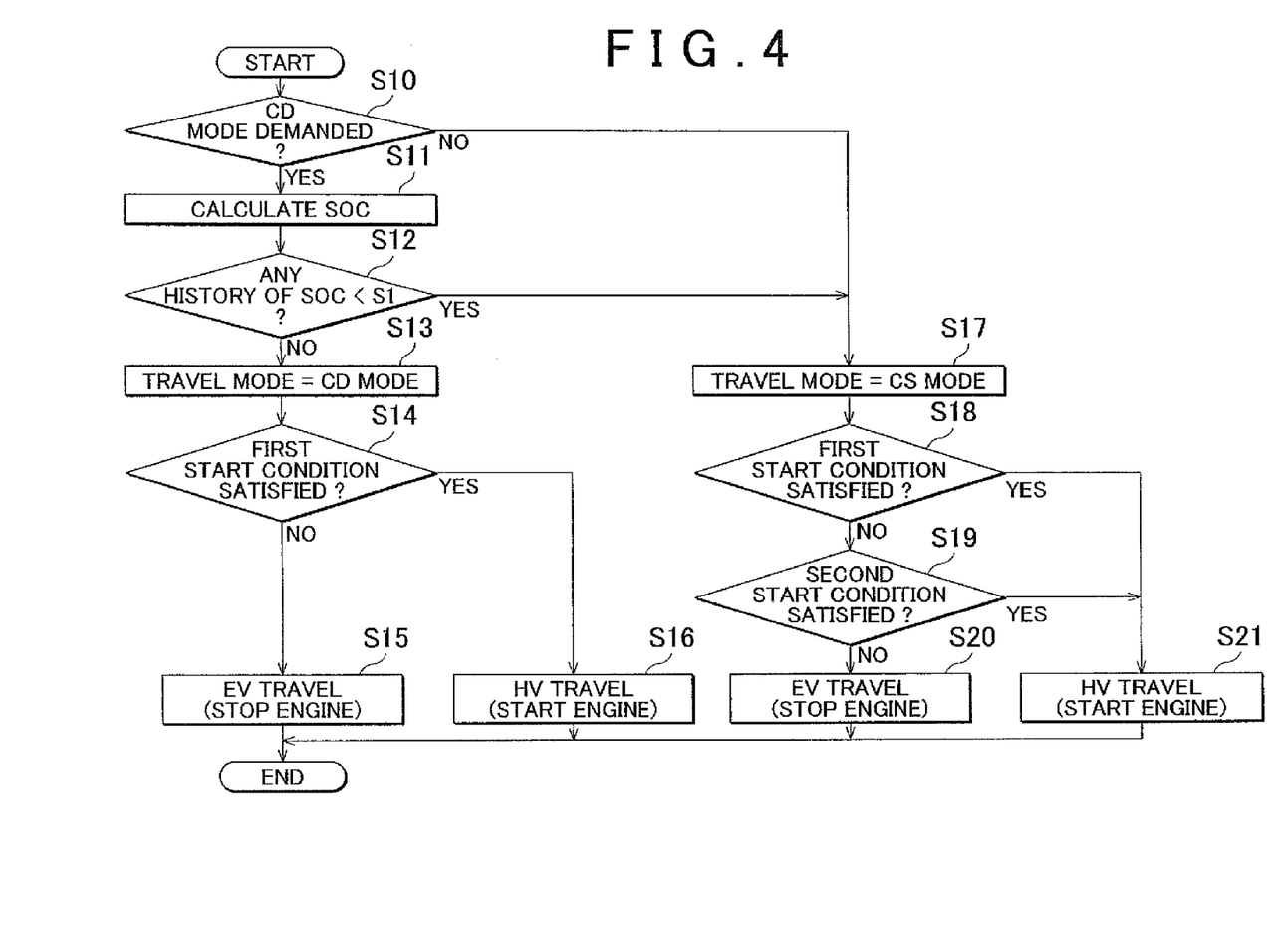
FIG. 4 is flowchart of the process executed by the ECU when a function of a travel control portion in the embodiment is to be realized.

FIG. 4 is a flow chart of the process executed by the ECU 400 when a function of the travel control portion 410 is to be realized. The process is executed in predetermined intervals.

In step 10 (hereinafter, step will be abbreviated as "S"), as shown in FIG. 4, the ECU 400 determines whether a user demands the CD mode, based on the signal from the selection switch 301.

If the user demands the CD mode, that is, if the determination in S10 is YES, the ECU 400 calculates the SOC of the battery 310 based on the signal from the monitor unit 340 in S11.

Then, in S12, the ECU 400 determines whether during the present trip of the vehicle 10, there is a history of the calculated SOC being smaller than a threshold value S1.

If there is no history of the SOC being below the threshold value S1, that is, if the answer to the determination in S12 is NO, the ECU 400 sets the travel mode to the CD mode in S13. Incidentally, the threshold value S1 is set to a very small value. Specifically, because the battery 310 can have been charged with electric power from the alternating-current power supply 19 which is very efficiently generated depending on electric power companies, the ECU 400 prioritizes operation in EV mode by selecting the CD mode, that is, the ECU 400 prioritizes propelling the vehicle 10 using only the electric power of the battery 310, until the electric power of the battery 310 is substantially used up.

While traveling in the CD mode, the ECU 400 determines in S14 whether the first engine start condition is satisfied. In the CD mode, driving of the engine 100 is not permitted in principle. Therefore, the first engine start condition is restricted to a condition that indicates high low, for example, a condition that the power that the user demands exceeds the outputtable power during the EV travel (the dischargeable power of the battery 310), a condition that the vehicle speed exceeds 100 km/h, etc. The power that the user demands may be output that the user demands, and the dischargeable power of the battery 310 may be a dischargeable electric power of the battery 310. The first engine start condition may serve as a first condition in the invention.

While traveling in the CD mode, if the first engine start condition is not satisfied, that is, if the answer to the determination in S14 is NO, the ECU 400 proceeds to S15, in which the ECU 400 stops the engine 100 and performs the EV travel. In contrast, if the first engine start condition is satisfied, that is, the answer to the determination in S14 is YES, the ECU 400 proceeds to S16, in which the ECU 400 starts the engine 100 to perform the HV travel.

Thus, in the CD mode, the EV travel is performed with priority, and the starting of the engine 100 is permitted only if the first engine start condition is satisfied.

In contrast, if the user demands the CS mode, that is, if the answer to the determination in S10 is NO, or if the SOC falls below the threshold value S1 during the present trip of the vehicle, that is, if the answer to the determination in S12 is YES, the ECU 400 proceeds to S17, in which the ECU 400 sets the travel mode to the CS mode. Therefore, after the change to the CS mode as a result of the SOC falling below the threshold value S1 during the CD mode, the CS mode is maintained during the trip even if the SOC rises to the threshold value S1 or greater.

When traveling in the CS mode, the ECU 400 determines in S18 whether the first engine start condition for the engine 100 is satisfied. The first engine start condition may be limited to a condition that is the same condition as the condition used during the traveling in the CD mode and that shows a high load.

While traveling in the CS mode, the ECU 400 further determines in S19 whether a second engine start condition is satisfied, in addition to the first engine start condition. The second engine start condition is used to determine whether the MG(1) 300A should be used to generate electricity using motive power from the engine 100 in order to maintain the SOC in a predetermined range. For example, the second engine start condition may be set so that it is satisfied when the SOC has dropped near the lower-limit value of a predetermined range. The second engine start condition may serve as a second condition in the invention.

While traveling in the CS mode, if neither the first engine start condition nor the second engine start condition is satisfied, that is, if the answer to the determinations in S18 and S19 are NO, the ECU 400 stops the engine 100 to perform the EV travel in S20. However, if at least one of the first engine start condition and the second engine start condition is satisfied, that is, if the answer to the determination in either one of S18 or S19 is YES, the ECU 400 starts the engine 100 to perform the HV travel in S21.

Thus, during the CS mode, the starting of the engine 100 is permitted when either the second engine start condition is or the first engine start condition is satisfied.

As described above, the travel control portion 410 selects one of the two travel modes to cause the vehicle 10 to travel. The function of the travel control portion 410 is substantially what has been described above.

Next, referring back to FIG. 3, the abnormality determination portion 420 will be described in detail. The abnormality determination portion 420 determines whether the quality of the exhaust from the engine 100 has deteriorated. If the abnormality determination portion 420 determines that the exhaust from the engine 100 has deteriorated, the abnormality determination portion 420 displays an indication on an information panel to inform the user that the exhaust has deteriorated. That is, the information panel may function as a notification portion in the invention.

In the embodiment, the term "exhaust deteriorates" means that the amount of pollutants contained in the exhaust from the engine 100 exceeds a threshold amount, as described above. An example in which the pollutant is hydrocarbon (abbreviated as "HC") will be described below.

The abnormality determination portion 420 changes a condition for determining that the engine exhaust has deteriorated (hereinafter, referred to as "exhaust deterioration condition") based on the travel mode.

Figure 5:
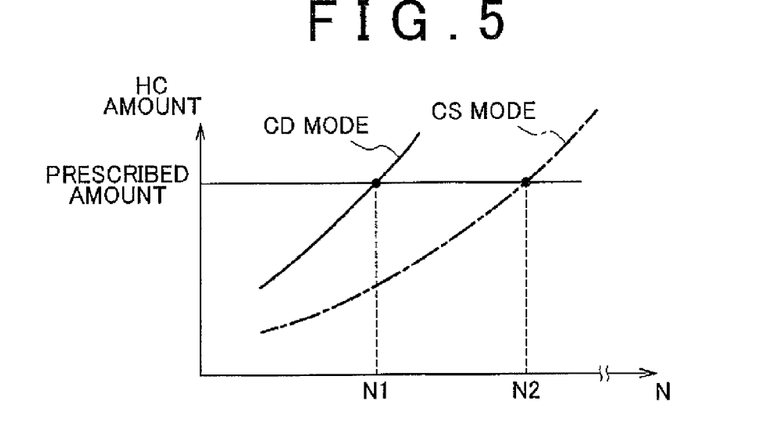
FIG. 5 is a diagram that shows the correlation between the number of times of the engine misfires with the amount of hydrocarbon contained in exhaust from the engine in the embodiment.

FIG. 5 shows the correlation between the number of times the engine 100 misfires over 1000 revolutions (hereinafter, referred to simply as "number of misfires N") and the amount of hydrocarbon contained in the exhaust (HC amount). In FIG. 5, a solid line shows the correlation between the number of misfires N and the HC amount in the CD mode, and the single-dot chain line shows the correlation between the number of misfires N and the HC amount in the CS mode. The correlations may be determined empirically.

As can be seen from FIG. 5, the correlation between the number of misfires N and the HC amount differs between the CD mode and the CS mode. Specifically, during the CD mode, if the number of misfires N reaches a threshold number of misfires N1, the HC amount exceeds the prescribed amount. In contrast, in the CS mode, when the number of misfires N reaches the predetermined number of misfires N1, the HC amount is still below the threshold amount. Only when the number of misfires N reaches a predetermined number of misfires N2, which is greater than the predetermined number of misfires N1, the HC amount exceeds the prescribed amount.

The difference in the correspondence relationship is attributable to the difference in the engine start condition for the engine 100 between the CD mode and the CS mode.

That is, during the CS mode, the engine 100 is started if it is necessary to generate electricity using motive power from the engine 100 (when the second engine start condition is satisfied) or when the load is high (when the first engine start condition is satisfied). Therefore, because the engine 100 is started more frequently than during the CD mode, the engine 100 and the catalyst 140 are likely to be kept at relatively warm temperature during the CS mode.

On the other hand, during the CD mode, the engine 100 is not started unless the load is high (unless the first engine start condition is satisfied). Therefore, the duration during which the engine 100 is stopped tends to be long during the CD mode. Therefore, when the engine 100 is started during the CD mode, the engine 100 is generally cold. When the engine 100 is cold a mixture combustion failure is more likely to occur, which contributes to the increase in the HC amount during the CD mode than during the CS mode, that is, the exhaust is more likely to deteriorate during the CD mode than during the CS mode for a given number of misfires N.

Taking such a difference in the correspondence relationship into account, the abnormality determination portion 420 changes the exhaust deterioration condition according to the travel mode. Now, a case where during the CD mode, the exhaust deterioration condition is set to a condition that "the number of misfires N is greater than the predetermined number of misfires N1" and where after the travel mode has changed to the CS mode, the exhaust deterioration condition is changed to a condition that "the number of misfires N is greater than the predetermined number of misfires N2" will be described below.

Figure 6:
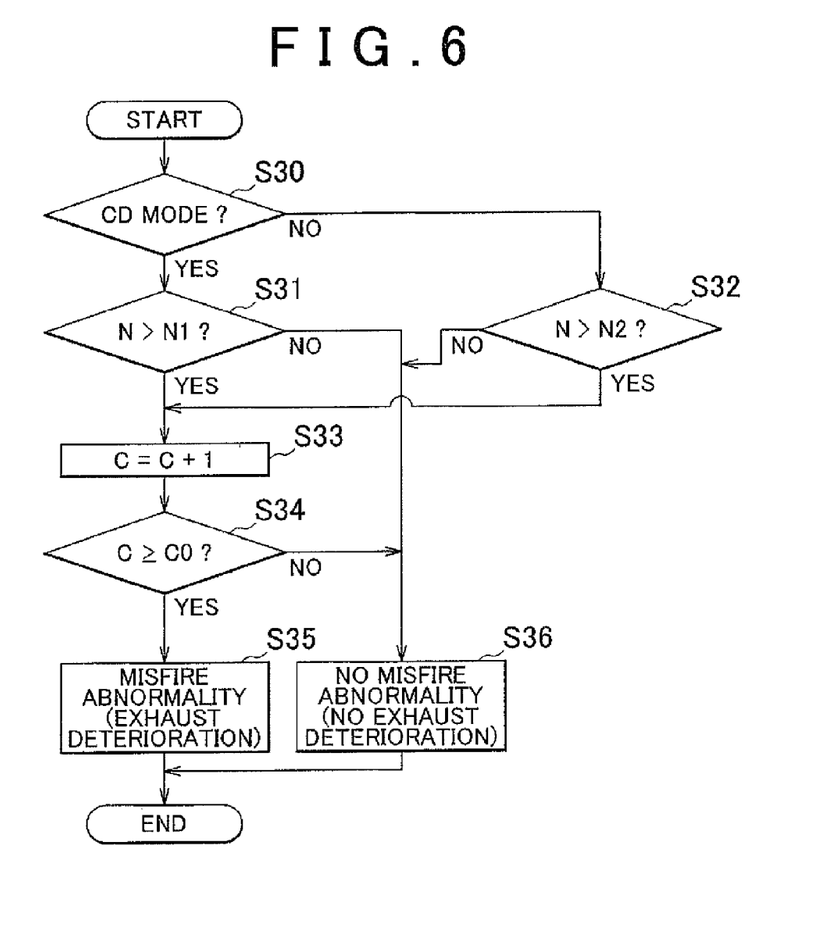
FIG. 6 is a flowchart of the process executed by the ECU when a function of an abnormality determination portion in accordance with the embodiment is to be realized.

FIG. 6 is a flowchart of the process executed by the ECU 400 to implement the function of the abnormality determination portion 420. The process is executed a predetermined intervals.

In S30 in FIG. 6, the ECU 400 determines whether the vehicle is traveling in the CD mode. If the vehicle is traveling in the CD mode (i.e., if the answer to the determination in S30 is YES), the ECU 400 determines in S31 whether the number of misfires N is greater than the threshold number of misfires N1. That is, the ECU 400 sets the exhaust deterioration condition so that the condition is satisfied when "the number of misfires N is greater than the threshold number of misfires N1". The predetermined number of misfires N1 is the value of the number of misfires N when the amount of HC reaches the threshold amount during the CD mode, and may be determined empirically. In particular, a conventional technique may be used to calculate the number of misfires N. For example, a time T30 required for a change of 30 degrees in the crank angle CA is computed. Then, every time a difference between the present required time T30 and the required time T30 that is required a crank angle of 720 degrees before exceeds a threshold value, it is determine that a misfire has occurred in one of the cylinders, and the count of the number of misfires is incremented. Accordingly, the total count obtained over 1000 revolutions of the engine 100 may be determined as the number of misfires N. This applies in the following description as well.

However, if the vehicle is traveling in the CS mode, that is, the answer to the determination in S30 is NO, the ECU 400 determines whether the number of misfires N is greater than the threshold number of misfires N2 in S32. Specifically, the ECU 400 sets the exhaust deterioration condition to the condition that "the number of misfires N is greater than the predetermined number of misfires N2". As shown in FIG. 5, the threshold number of misfires N2 is the number of misfires N that occur when the HC amount reaches the threshold amount if the CS mode, and is greater than the predetermined number of misfires N1. The threshold number of misfires N2 may be determined empirically.

If the exhaust deterioration condition is satisfied during either one of the travel modes, that is, if the determination in either S31 or S32 is YES, the ECU 400 increments a misfire counter C by 1 in S33. The misfire counter C is a parameter that indicates the number of times that the exhaust deterioration condition has been satisfied. The initial value of the misfire counter is 0.

In S34 in FIG. 6, the ECU 400 determines whether the misfire counter C is greater than or equal to a predetermined value C0. The process in S34 is a process for determining whether the exhaust deterioration condition has continued to be satisfied, for example, if the HC amount per 1000 revolutions of the engine remains above the threshold amount, to increase the reliability of the determination that the exhaust has deteriorated. For example, if the predetermined value C0 is set at "4", the ECU 400 may determine whether the exhaust deterioration condition has continually been satisfied four or more times, for example, whether the HC amount over every 1000 revolutions of the engine is greater than the prescribed amount has continued for at least 4000 of the engine. The threshold value C0 is not limited to the value of "4".

If the misfire counter C is greater than or equal to the threshold value C0, that is, if the answer to the determination in S34 is YES, the ECU 400 determines in S35 that a misfire abnormality in which at least one of the cylinders has misfired, and that due to the misfire abnormality, the exhaust has deteriorated.

In contrast, if the exhaust deterioration condition is not satisfied during either travel mode, that is, if the answer to the determination in S31 or S32 is NO, or if the exhaust deterioration condition has been satisfied but the misfire counter C is below the threshold value C0, that is, if the answer to the determination in S34 is NO, the ECU 400 determines in S36 that the misfire abnormality is not present and the exhaust has not deteriorated. Incidentally, after the process of S36, the misfire counter C is re-set to an initial value of 0.

As described above, according to the embodiment, in a vehicle that has two travel modes, that is, the CD mode and the CS mode, the exhaust deterioration condition is changed in accordance with the selected travel mode. With this configuration, it is possible to set an exhaust deterioration condition that is appropriate for the operating condition of the engine in each travel mode, so that deterioration of the exhaust may be accurately detected.

In the above-described embodiment, whether deterioration of the exhaust has occurred is determined based on the number of misfires N; however, the occurrence of deterioration of the exhaust may also be determined using parameters other than or in addition to the number of misfires N. For example, state quantities of the engine 100 that correlate with misfiring of the engine 100, such as the magnitude of vibration of the engine 100 and the number and frequency of occurrences of vibration of the engine 100, the air/fuel ratio A/F, etc., may be used as a parameter to determine whether deterioration of the exhaust has occurred. In this case, it suffices that correlation between the various parameters and the HC amount (see a map shown in FIG. 5) may be empirically determined for each travel mode, and that exhaust deterioration conditions are set separately for each travel mode in accordance with the appropriate correlations.

In the CD mode, because the engine 100 is started only when the load is high, the engine 100 tends to be stopped for extended periods of time. However, if high load continues for a long time, or occurs frequently, the engine 100 is likely started more frequently and driven for a longer time. Therefore, during the CD mode, the state of the engine 100 when the engine 100 is started tends to vary.

Accordingly, the embodiment may be modified so that if the number of misfires N is greater than a threshold number of misfires N1, operation of the engine 100 continues, and after the state of the engine 100 becomes stable, it is again determined whether deterioration of the exhaust has occurred.

Figure 7:
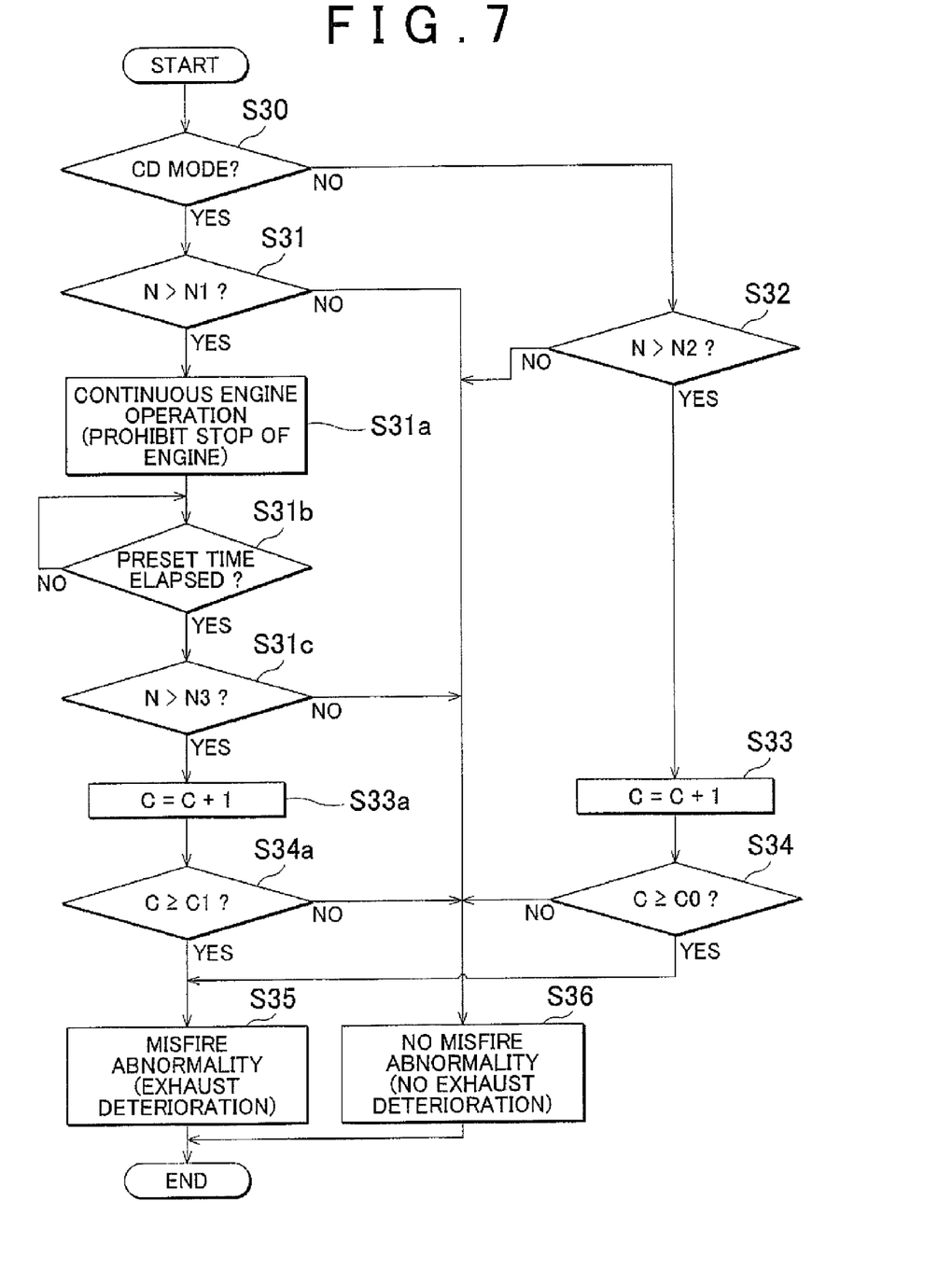
FIG. 7 is a flowchart of the process executed by the ECU in accordance with a modification of the embodiment performs when the ECU performs abnormality determination.

FIG. 7 is a flowchart showing the process executed by an ECU 400 according to the modified embodiment when the ECU 400 performs the abnormality determination. In the flowchart shown in FIG. 7, the same processes as those shown in the flowchart shown in FIG. 6 are denoted by the same step numbers. These processes in FIG. 7 are also the same in content as those in FIG. 6. Therefore, detailed descriptions thereof will not be repeated below.

In the CD mode, if the number of misfires N exceeds a threshold number of misfires N1, that is, if the answer to the determination in S30 is YES and the answer to the determination in S31 is YES, the ECU 400 prohibits stopping of the engine 100 in S31a.

In S31b, the ECU 400 determines whether the engine 100 has been operating continuously for a prescribed period of time. Incidentally, the prescribed period of time is sufficiently long to allow the catalyst 140 to warm up.

If the prescribed period of time has elapsed after the engine 100 has started operating continuously, that is, when the answer to the determination in S31b is YES, the ECU 400 determines in S31c whether the number of misfires N exceeds another threshold number of misfires N3. That is, the ECU 400 changes the exhaust deterioration condition to a condition that "the number of misfires N is greater than the predetermined number of misfires N3". The threshold number of misfires N3 may be set based on the duration of the continuous operation of the engine 100. For example, if the state of the engine 100 is more stable than during the CD mode and during the CS mode because the engine 100 has been operating continuously for a predetermined time, the threshold number of misfires N3 may be set higher than the threshold numbers of misfires N1 and N2. The threshold number of misfires N3 may be set equal to the threshold number of misfires N2 used during the CS mode.

Then, if the number of misfires N exceeds the threshold number of misfires N3, that is, if the answer to the determination in S31c is YES, the ECU 400 increments the misfire counter C by 1 in S33a, and then determines whether the misfire counter C equals or exceeds a threshold value C1 in S34a. Taking it into account that it has been determined in the process of S31 that the number of misfires N exceeds the threshold number of misfires N1 in the process of S31, the predetermined value C1 may be set to a value that is smaller than the predetermined value C0 by 1.

Then, if the misfire counter C is greater than or equal to the threshold value C1, that is, the answer to the determination in S34a is YES, the ECU 400 determines in S35 that misfires have occurred and that the exhaust has deteriorated.

However, if the number of misfires N is less than the threshold number of misfires N3, that is, if the answer to the determination in S31c is NO, or if the misfire counter C is less than the threshold value C1, that is, if the answer to the determination in S34a is NO, the ECU 400 determines in S36 that the misfires have not occurred and, hence, that the exhaust has not deteriorated.

In FIG. 7, the exhaust deterioration determination process performed following the negative determination in S30 is the same as that shown in FIG. 6.

Thus, in this modification, it is taken into account that the state of the engine 100 at the time of start thereof during the CD mode tends to vary. Then, if during the CD mode, the exhaust deterioration condition is satisfied, the engine 100 continues to be operated. Then, after the state of the engine 100 becomes stable, the presence or absence of deterioration of the exhaust is determined again. Accordingly, it is possible to determine whether the exhaust has deteriorated, when the engine 100 is in a stable state. Therefore, the accuracy of the determination as to the presence or absence of deterioration of the exhaust due to misfiring can be improved.

The embodiments described in this application are illustrative and should not be considered restrictive in any respect. The scope of the invention is defined not by the above descriptions but by the appended claims, and is intended to cover all the modifications within the meaning and scope equivalent to those of the claims.

What is claimed is:

1. A control apparatus for a vehicle that includes an internal combustion engine, an electric motor, and a battery that supplies electric power to the electric motor, the vehicle is propelled by motive power from at least one of the internal combustion engine and the electric motor, the control apparatus comprising:
   a control portion that controls the vehicle to travel in a travel mode of a plurality of travel modes that includes a first travel mode and a second travel mode, in the first travel mode consumption of electric power of the battery is given priority over the maintenance of a state of charge of the battery, and in the second travel mode maintenance of the state of charge of the battery is given priority over consumption of electric power of the battery; and
   a determination portion that determines whether exhaust from the internal combustion engine has deteriorated when a deterioration determination condition is satisfied, the determination portion determines that the deterioration determination condition is satisfied by comparing a physical quantity to a threshold value, the physical quantity is a state quantity of the internal combustion engine which increases according to occurrence of misfire of the internal combustion engine,
   wherein the determination portion changes the deterioration determination condition for determining whether the exhaust has deteriorated, the determination portion sets the deterioration determination condition to a first condition in the first travel mode, and sets the deterioration determination condition to a second condition in the second travel mode, the first condition is satisfied when the physical quantity exceeds a first threshold value as the threshold value, and the second condition is satisfied when the physical quantity exceeds a second threshold value as the threshold value, the second threshold that is greater than the first threshold value.

2. The vehicle control apparatus according to claim 1, wherein driving of the internal combustion engine is not permitted unless load is high in the first travel mode, and the driving of the internal combustion engine is permitted when either the load is high or when the state of charge of the battery has decreased to a vicinity of a lower-limit value of a predetermined range of the state of charge.

3. The vehicle control apparatus according to claim 2 wherein when the load is high is at least one of when an output that a user demands exceeds a dischargeable electric power of the battery and when vehicle speed exceeds 100 km/h.

4. The vehicle control apparatus according to claim 1, wherein if the first condition is satisfied in the first travel mode, the control portion performs a continuous operation of prohibiting stop of the internal combustion engine and continues operating the internal combustion engine, and if the first condition is satisfied in the second travel mode, the determination portion determines whether the exhaust has deteriorated using a third condition, which differs from the first condition and from the second condition, as the deterioration determination condition when or after a predetermined period of time elapses following start of the continuous operation.

5. The vehicle control apparatus according to claim 4, wherein the first condition is satisfied when a physical quantity that corresponds to a misfire of the internal combustion engine exceeds a first threshold value, and the second condition is satisfied when the physical quantity exceeds a second threshold value that is greater than the first threshold value, and the third condition is satisfied when the physical quantity exceeds a third threshold value as the threshold value, the third threshold value is greater than the second threshold value.

6. The vehicle control apparatus according to claim 1, wherein the first threshold value is the state quantity that occurs when an amount of pollutants contained in the exhaust equals a predetermined amount in the first travel mode, and the second threshold value is the state quantity that occurs when the amount of pollutants equals the predetermined amount in the second travel mode.

7. The vehicle control apparatus according to claim 1, wherein the state quantity is a number of misfires that occur in the internal combustion engine over a prescribed number of revolutions of the internal combustion engine.

8. The vehicle control apparatus according to claim 1, wherein the state quantity is at least one of magnitude of vibration of the internal combustion engine, a number of occurrences of the vibration, and air/fuel ratio of the internal combustion engine.

9. The vehicle control apparatus according to claim 1 wherein the vehicle further includes a notification portion that notifies a user if the determination portion determines that the exhaust from the internal combustion engine has deteriorated.

10. The vehicle control apparatus according to claim 1, wherein in the first travel mode driving of the internal combustion engine is permitted when at least one of a condition that a power that a user demands exceeds a first predetermined power and a condition that a vehicle speed exceeds a first predetermined speed is satisfied, and in the second travel mode driving of the internal combustion engine is permitted when at least one of a condition that the power that the user demand exceeds a second predetermined power and a condition that the vehicle speed exceeds a second predetermined speed is satisfied and also when it is necessary to generate electricity using motive power from the internal combustion engine.

11. The vehicle control apparatus according to claim 1 wherein the vehicle further comprises:
a switch that a user uses to select the travel mode that the user demands from the plurality of travel modes and input the selected travel mode, and wherein the control portion selects the travel mode based on the state of charge of the battery and output of the switch.

12. A method of controlling a control apparatus for a vehicle that includes an internal combustion engine, an electric motor, and a battery that supplies electric power to the electric motor, the vehicle is propelled by at least one of the internal combustion engine and the electric motor, the control method comprising:
controlling the vehicle to travel in a travel mode of a plurality of travel modes that includes a first travel mode and a second travel mode, in the first travel mode consumption of electric power of the battery is given priority over the maintenance of a state of charge of the battery, and in the second travel mode maintenance of the state of charge of the battery is given priority over consumption of electric power of the battery;
determining whether exhaust from the internal combustion engine has deteriorated when a deterioration determination condition is satisfied, the deterioration determination condition is determined to be satisfied by comparing a physical quantity to a threshold value, the physical quantity is a state quantity of the internal combustion engine which increases according to occurrence of misfire of the internal combustion engine; and
changing the deterioration determination condition for determining that the exhaust has deteriorated, the determination portion sets the deterioration determination condition to a first condition in the first travel mode, and sets the deterioration determination condition to a second condition in the second travel mode, the first condition is satisfied when the physical quantity exceeds a first threshold value as the threshold value, and the second condition is satisfied when the physical quantity exceeds a second threshold value as the threshold value, the second threshold that is greater than the first threshold value.

13. The method of controlling the control apparatus according to claim 12, wherein in the first travel mode driving of the internal combustion engine is permitted when at least one of a condition that a power that a user demands exceeds a first predetermined power and a condition that a vehicle speed exceeds a first predetermined speed is satisfied, and in the second travel mode driving of the internal combustion engine is permitted when at least one of a condition that the power that the user demand exceeds a second predetermined power and a condition that the vehicle speed exceeds a second predetermined speed is satisfied and also when it is necessary to generate electricity using motive power from the internal combustion engine.

* * * * *